United States Patent [19]
Fletcher et al.

[11] 3,867,677
[45] Feb. 18, 1975

[54] MOTOR RUN-UP SYSTEM

[76] Inventors: James C. Fletcher, Administrator of the National Aeronautics and Space Administration with respect to an invention of; John J. Daeges, 309 Fowler Dr., Monrovia, Calif. 91016

[22] Filed: Mar. 7, 1974

[21] Appl. No.: 449,118

[52] U.S. Cl. ............... 318/137, 318/167, 318/176, 318/183
[51] Int. Cl. .............................................. H02p 1/00
[58] Field of Search ........... 318/136, 137, 167, 174, 318/175, 176, 183; 307/87

[56] References Cited
UNITED STATES PATENTS

| | | | |
|---|---|---|---|
| 2,977,520 | 3/1961 | MacGregor | 318/176 X |
| 3,048,755 | 8/1962 | Leonhard | 318/176 X |
| 3,170,103 | 2/1965 | Kutik | 318/137 |
| 3,337,785 | 8/1967 | Baude | 318/175 |

*Primary Examiner*—G. Z. Rubinson
*Attorney, Agent, or Firm*—Monte F. Mott; Paul F. McCaul; John R. Manning

[57] ABSTRACT

A starting system for bringing a large synchronous motor up to speed to prevent large power line disturbances at the moment the motor is connected to the power line, including a digital counter which generates a count determined by the difference in frequency between the power line and a small current generated by the synchronous motor, a latch which stores the count, and a comparator which compares the stored count with a newly generated count to determine whether the synchronous motor is accelerating or decelerating. Signals generated by the counter and comparator control current to a clutch that couples a starting motor to the large synchronous motor.

8 Claims, 3 Drawing Figures

3,867,677

MOTOR RUN-UP SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to motor starting circuits.

A motor-generator set is commonly used for frequency conversion, as in converting 60Hz line current to 400Hz current required for a high power radio transmitter. One type of apparatus utilizes a small induction motor which is coupled through an eddy current clutch to a large synchronous motor that drives the generator. Current to the clutch is gradually increased to accelerate the synchronous motor to full speed, so that when line current is applied to the synchronous motor there will be a minimum disturbance of the power line. In order to minimize power line transients, the motor should be brought up to the exact speed indicated by the actual power line frequency at the moment of connection, and the armature of the motor should be maintained at a predetermined phase with relation to the power line current. In addition to avoiding large power line transients, it is also desirable to provide for rapid starting of the motor, so that a large motor-generator set such as one which utilizes a 3500 horsepower motor may be started in only a few minutes.

SUMMARY OF THE INVENTION

In accordance with one embodiment of the present invention, a motor starting system is provided which digitally compares the motor speed with line frequency to smoothly accelerate the motor to full speed, and which provides a further acceleration or deceleration to bring the motor into phase with the power line, so that when the motor is connected to the power line a minimum of power line transients are generated. The system includes an up-down counter which is counted down during the period between a pair of successive cycles of the 60Hz power line, and which is counted up during the period between successive cycles or pulses from the motor. At a motor speed up to one representing 55Hz, pulses are obtained from a tachometer, while above 55Hz a field current is applied to the motor, and the motor is utilized as a generator to provide pulses indicating the motor speed. The net count from the up-down counter determines the level of current to an eddy current clutch that connects a starting motor to the synchronous motor.

In order to bring the synchronous motor smoothly to full speed, a digital circuit is provided to determine whether the motor is accelerating or decelerating. The circuit includes a latch which retains a count from the up-down counter and a comparator which compares the stored count in a latch with the present count of the up-down counter at one second intervals, to indicate whether the motor is accelerating or decelerating. This information plus an indication of the actual motor speed are utilized to smoothly bring the motor to full speed. When full speed is reached, a phase comparison of the power line and motor output is made to provide a small acceleration or deceleration so as to bring them into phase. Thus, when contacts are close between the power line and synchronous motor, the synchronous motor will be at precisely full speed and in phase with the power line so there will be a minimum of power line transients.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
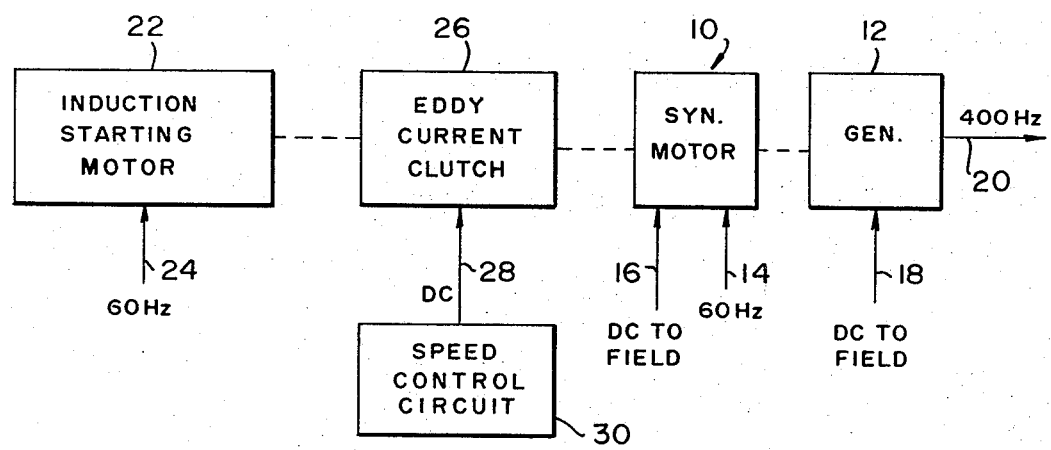
FIG. 1 is a simplified block diagram showing the elements of the motor starting system of the invention.

FIG. 1 illustrates a motor-generator set which includes a large synchronous motor 10 which drives a large generator 12 to convert 60Hz current into 400Hz current. In one application, the main or synchronous motor 10 has a 3500 horsepower rating, and is energized by current over an input 14 that is connected to a three-phase, 2400 volt, 60Hz power line, as well as by a direct current applied to the field of the synchronous motor over another input 16. The generator 12 also receives field current over a line 18, and it delivers a three-phase, 400Hz current over an output line 20. The large synchronous motor 10 is brought up to speed by a small induction starting motor 22 which is energized over an input 24 which is connected to a three-phase 460 volt, 60Hz power line. The starting motor 22 is connected through an eddy current clutch 26 to the synchronous motor 10. The degree of coupling depends upon the amount of dc current delivered over a clutch input 28 from a speed control circuit 30. It is desirable to vary the current input to the clutch 26 so that it rapidly accelerates the synchronous motor up to nearly full speed, with the acceleration then decreasing so that full speed is smoothly reached. After full speed is reached, it is desirable to maintain the synchronous motor so that it will be "in phase" with the power line to be connected at 14. A switch then may be thrown to connect the power line to the synchronous motor, so that the power line thereafter drives the synchronous motor and therefore large currents can be drawn from the generator 12.

Figure 2:
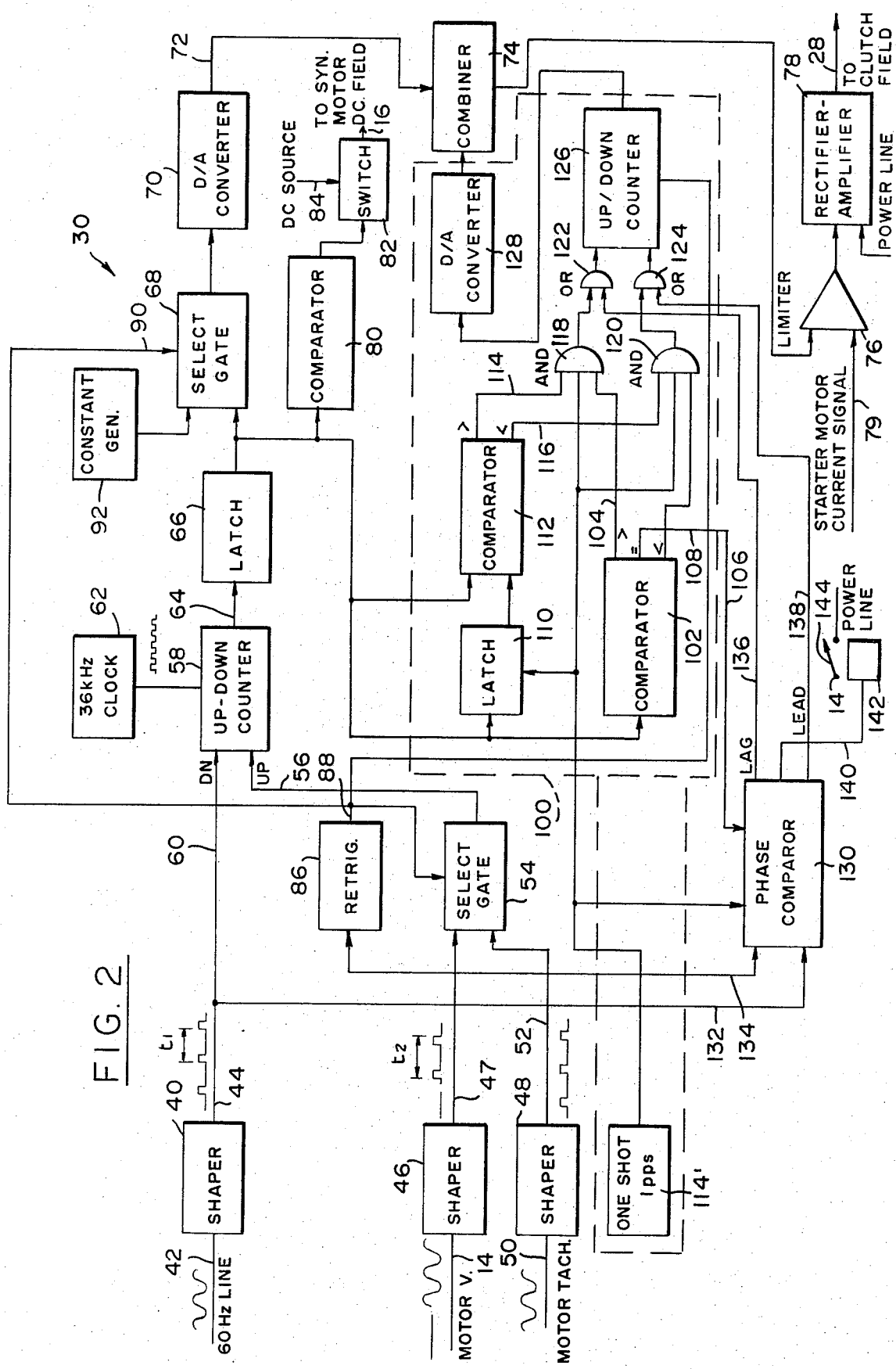
FIG. 2 is a block diagram of the control circuitry for the system of FIG. 1.

FIG. 2 illustrates details of the circuit 30 which determines the amount of current to be applied to the eddy current clutch over the line 28. The circuit includes a first shaper 40 whose input 42 is connected to the 60Hz power line, and whose output 44 delivers pulses synchronized with cycles of the power line. A second shaper 46 receives current, if any, generated by the synchronous motor 10 when it is being utilized as a generator. The synchronous motor generates an alternating current on its line 14 when a current is applied to the field of the synchronous motor. The frequency of the motor-generated current in proportion to the speed of the motor, and is 60Hz at full speed. A field current is applied to the synchronous motor only at a speed corresponding to more than 55Hz. A third shaper 48 receives current over a line 50 from a motor tachometer and delivers pulses over a line 52. The tachometer is used only prior to nearly full speed, because a tachometer often must be connected by a belt to the motor shaft, so that its accuracy is limited. The outputs of the two shapers 46, 48 are delivered through a select gate 54, which selects one of them and delivers it to the up input 56 of an up-down counter 58. The down input 60 of the counter is connected to the line 44 whose pulses represent those from the power line.

The counter 58 is connected to a clock 62 which delivers pulses at a high rate such as 36KHz. The counter 58 begins with a predetermined count such as 712 and counts down therefrom during the time period $t_1$ between successive pulses on the power line. It then counts up during the time period $t_2$ between successive pulses from the select gate 54. Thus, for a 60Hz power line and a motor speed corresponding to 55Hz, the counter 58 begins with a count of 712, then counts down by 600 during the time between successive power line pulses, and then counts up by 655 during the time between successive pulses from the tachometer or motor output. Thus, the net count delivered by the counter over line 64 will be 767. A memory or latch 56 is provided to retain each count, while the counter 58 returns to its original count of 712 and begins making a new count. New counts may be delivered as rapidly as 30 times per second.

The count in the latch 66 is delivered to a select gate 68 which can pass the count to a digital-analog converter 70 which generates an analog signal over line 72 corresponding to the level of the count. Thus, if the motor is rotating slowly so that a large count will be held in the latch 66, then the converter 70 will deliver a large voltage over line 72. The voltage on line 72 can pass through a combiner 74 to a limiter 76, and can pass through the limiter 76 to an amplifier 78 whose output line 28 is connected to the eddy current clutch. The higher the voltage generated by the digital-analog converter 70 over line 72, the greater the current over line 28 to the clutch, and therefore the greater the acceleration of the synchronous motor. Thus, when the synchronous motor is rotating at less than full speed, a large current will be applied to the clutch so that it can accelerate the motor rapidly towards full speed. A signal on a line 79 representing the level of current to the starting motor 22 is also provided to the limiter 76 to hold the output of the limiter below a predetermined level so that the starting motor is not overloaded. As full speed is approached, the count in the latch 66 will decrease so that it will tend to control the amplifier 78 to deliver a current level to the clutch that tends to maintain the synchronous motor at an approximately constant speed.

The circuit of FIG. 2 is designed to utilize the output of the motor tachometer on line 50 when the speed of the synchronous motor is below a level corresponding to 55Hz, and to thereafter utilize current actually generated by the synchronous motor. To provide for this, a comparator 80 is provided which repeatedly samples the count of the latch 66. When this count decreases below a certain level such as 767, which indicates a motor speed above the 55Hz level, the comparator 80 delivers a signal to a switch 82 to close the switch. When the switch 82 is closed, it thereafter delivers a dc current from a source line 84 to the line 16 that leads to the field windings of the synchronous motor. Thus, when the motor speed exceeds the 55Hz level, a field current is supplied to the motor and the motor can thereafter act as a generator which supplies a small output current over the line 14.

As earlier described, the line 14 which carries alternating current generated by the synchronous motor, is connected to the shaper 46 whose output passes to a select gate 54. The output of the shaper 46 is also delivered to a retriggerable circuit 86, to cause the circuit 86 to trigger and thereafter deliver a current on its output 88. This current is delivered to the select gate 54 so that the gate thereafter delivers pulses received on line 47, which represent pulses derived from the synchronous motor windings, rather than delivering pulses from the tachometer. The output 88 of the retriggerable circuit is also delivered to an input 90 of the select gate 68. Until the pulse on line 90 is received, the select gate 68 passes the signals received from a constant generator 92, so that the value delivered to the digital-analog converter 70 is at a constant high level. This assures a constant high current to the eddy current clutch to provide high acceleration. After a pulse is received on line 90, the gate 68 delivers a value equal to the count in the latch 66, which decreases as the motor speed approaches the 60Hz level. Thus, a constant high signal is applied to the eddy current clutch until the motor reaches the 55Hz level, after which the current to the clutch can decrease as the motor approaches full speed.

The speed control circuit 30 also includes an acceleration-sensing circuit portion 100 which is utilized to determine whether the motor speed is above or below the 60Hz level and if the motor is accelerating or decelerating, in order to bring the motor smoothly into the 60Hz level. The circuit portion 100 includes a comparator 102 which senses the count held in the latch 66 and delivers a signal on one of three lines 104, 106, 108 which respectively indicates whether the motor is at a speed greater than, equal to, or less than the 60Hz level.

A determination of acceleration is made by a latch or memory 110 and another comparator 112. The latch 110 stores, for a period of 1 second, the count received from the latch 66. After each second, a pulse generator 114, which delivers one pulse per second, operates the latch 110 to change its count to whatever new count is being delivered by the latch 66. The comparator 112 compares the latest count being delivered by the latch 66 with the count stored in the latch 110, and delivers a signal on line 114 or 116 respectively indicating whether the new count from the latch 66 is greater than or less than the previous count held in the latch 110. The count delivered by the latch 66 may change as often as 30 times per second, while the count from latch 110 changes only once per second. A signal on line 114 indicates that the motor is not decelerating while a signal on line 116 indicates that the motor is not accelerating.

The outputs from the two comparators 112 and 102 are delivered to two AND gates 118, 120. The AND gate 118 receives pulses from the lines 114 and 104 that respectively indicate that the motor is not decelerating and is at a speed greater than the 60Hz level. A pulse from the gate 118 is utilized to slow down the motor. In a corresponding manner, the AND gate 120 receives pulses from lines 116 and 108 that respectively indicate that the motor is not accelerating and is at a speed less than the 60Hz level, the output from gate 120 serving to increase the motor speed. Both gates 118, 120 also receive pulses from the one-shot generator 114, so that they can pass a pulse only once each second.

The outputs from the gates 118, 120 pass through OR gates 122, 124 to an up-down counter 126. The counter 126, which operates only after the synchronous motor has reached a speed corresponding to 55Hz, which is indicated when the retriggering circuit 86 delivers an output thereto, delivers its count to a digital-analog converter 128 whose output is delivered to the combiner 74. The combiner 74 combines the outputs of the two converters 70 and 128 to deliver an output which represents the sum of the outputs of the two converters. A simple resistor divider network can be utilized for the combiner. Thus, the circuit portion 100 acts as a fine adjustment mechanism which tends to maintain the motor speed at the 60Hz level, by sensing whether the motor is above or below the 60Hz level, to decrease the clutch current if the motor is above the 60Hz level and not decelerating, and to increase the clutch current if the motor is below 60Hz and not accelerating.

In order to minimize power line transients, it is desirable to bring the motor armature into phase with the power line prior to connecting the motor input to the power line. A phase comparer 130 is provided which has one input 132 connected to the power line pulses received from shaper 40 and another input 134 connected to the synchronous motor pulses received from shaper 46. The phase comparer 130 compares the phases once each second, when it receives a pulse from the one-shot circuit 114, and delivers a signal on lines 136 or 138 to indicate that the motor is lagging or leading, respectively. In order to prevent operation of the phase comparer circuit 130 until the motor is just ready to be connected to the line, the circuit 130 is not activated except during the period when a current is received over line 106 from the comparator 102 to indicate that the speed of the motor is at the 60Hz level. A pulse on line 136, resulting from the motor lagging the power line, passes through the OR gate 122 to the counter 126 to increase the count thereof and cause acceleration of the motor. On the other hand, a pulse over line 138 indicating that the motor is leading the power line, results in a pulse passing through the OR gate 128 to the counter to count down the counter and cause a deceleration of the motor. When the motor and line currents are in phase, the phase comparer delivers a signal over line 140 to a relay 142 which controls the connection of the synchronous motor line 14 to the power line. The signal on line 140 operates the relay 142 to close relay 144. The synchronous motor 10 is thereafter connected to the power line and it can drive the generator 12 to deliver large currents.

Figure 3:
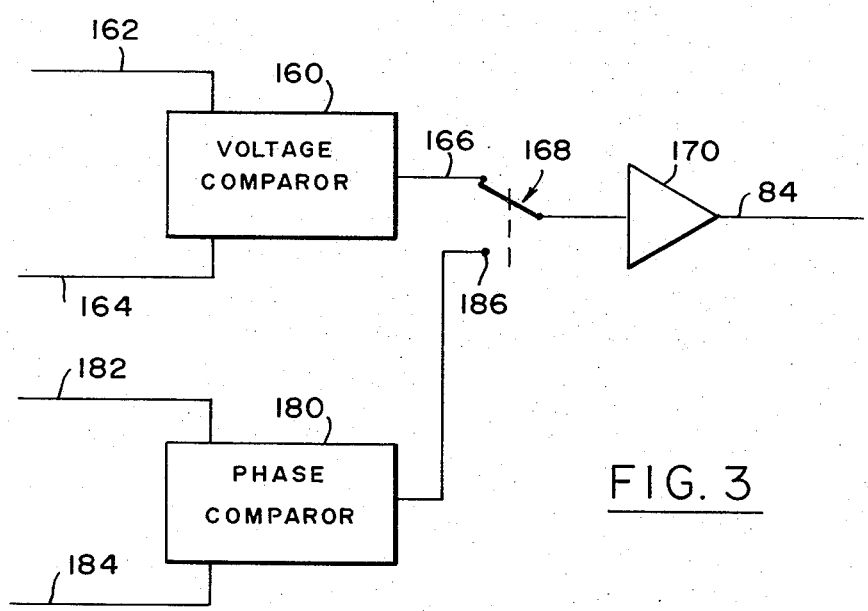
FIG. 3 is a simplified block diagram of a power factor comparator circuit which can be utilized with the system of FIG. 1.

In addition to circuits for matching the speed and phase of the motor armature to the frequency and phase of the power line, circuits are also provided to match the motor voltage to line voltage prior to connecting the motor to the line. The synchronous motor voltage is varied by varying the field current supplied to the motor over line 16. FIG. 3 illustrates a circuit which includes a voltage comparator 160 with inputs 162, 164 respectively connected to the power line and to the motor output to compare the voltages, and which generates an output on line 166 representing the difference or error voltage. This error voltage passes through a switch 168 and amplifier 170 to the line 84 through which the current can pass to the field of the synchronous motor at the input 16 thereof. The amplified "error voltage" from amplifier 170 increases or decreases as the motor voltage respectively falls below or rises toward line voltage, so that the amplified error voltage and therefore the current to the field of the motor tends towards a level which will make motor voltage approximately equal to line voltage. The voltage comparor 160 is not activated until the motor speed reaches the 55Hz level.

A short time after the motor has been placed "on line" or in other words, connected to the power line to be energized by it, the field of the motor is varied to maintain a unity power factor. This is accomplished by another phase comparer circuit 180 with inputs 182, 184 that respectively carry signals representing the voltage applied to the synchronous motor and the current applied thereto. After the motor has been placed on line, the switch 168 is moved to a contact 186 so that the "error voltage" output from phase comparer 180 is delivered to amplifier 170 to vary the field current to the motor to raise the power factor towards unity.

Thus, the invention provides a system for rapidly bringing a large synchronous motor up to full speed and to the same phase and voltage as the power line, to minimize power line disturbances at the moment of connection of the motor armature to the power line. This is accomplished by utilizing a digital circuit which generates a count indicating the difference between actual motor speed and actual line frequency, and by utilizing a circuit which compares successive counts to indicate whether the motor is accelerating or decelerating. The current to a clutch that couples the starting motor to the synchronous motor, is varied according to whether the motor is accelerating or decelerating and whether its speed is above or below the full speed level, with the actual power line frequency being the standard against which motor speed is compared. The circuit also compares the phase of the motor and power line and connects the armature of the motor to the power line only when they are in phase and the motor is at full speed. The circuit bases all determinations on actual power line conditions, and makes digital comparisons, so that high accuracy is assured.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. Motor apparatus comprising:

a synchronous motor having an armature and field;

a starting motor;

an eddy current clutch coupling having first and second inputs, for generating a count dependent upon the difference in pulse separations on said inputs;

first means coupling the power line to said first input of said counter;

second means for coupling the armature of the synchronous motor to the second input of said counter, so that the generated count represents the difference in frequency between current on the power line and current generated by the synchronous motor;

a first latch connected to said counter to retain the count;

a digital-to-analog converter;

third means for coupling the latch to the input of said converter; and fourth means for coupling the output of said converter to said eddy-current clutch.

2. The apparatus described in claim 1 including:

a tachometer coupled to the synchronous motor, for generating a current having a frequency proportional to the speed of the synchronous motor; and wherein said first means includes a select gate for alternately coupling the armature of the synchronous motor or the tachometer, to the second input of said up-down counter; and further including a trigger circuit responsive to the presence of current from the armature of the synchronous motor, for operating the select gate to couple the armature to the second input of the counter; and comparator means coupled to said latch, for delivering current to the field of the synchronous motor when a predetermined count is detected, whereby when a predetermined motor speed is reached speed sensing is shifted from the tachometer to the armature of the synchronous motor.

3. The apparatus described in claim 1 including:

second latch means coupled to said first latch, for retaining the count which is present in the first latch at predetermined intervals;

comparator means for comparing the counts in the first latch and second latch means, said comparator means generating a first signal if the count in the first latch is larger and generating a second signal if the count in the second latch means is larger; and means responsive to the output of the comparator means for increasing or decreasing the current to the clutch, whereby the acceleration of the synchronous motor is partially controlled in accordance with whether it is already accelerating or decelerating.

4. The apparatus described in claim 1 including:

a phase comparor coupled to the power line and the armature of the synchronous motor, for generating signals respectively indicating whether current from the power line is lagging, leading, or in phase with current from the armature of the synchronous motor;

a speed comparor coupled to said latch, for generating signals indicating whether the count in the latch is above, below, or equal to a predetermined count;

a power line switch operable to connect the armature of the synchronous motor to the power line; and means coupled to said phase and speed comparors, for operating said power line switch only when the output of the phase comparor indicates that current from the armature of the synchronous motor is in phase with the current on the power line and the output of the speed comparor indicates that the count in the latch equals said predetermined count.

5. Motor starting apparatus for controlling the acceleration of a main motor and its connection to an alternating current power line, comprising:

a starting motor;

a current-energized clutch for coupling the starting motor to the main motor to bring the main motor up to speed, the degree of coupling being determined by the amount of current delivered to the clutch;

counter means coupled to the power line and the main motor, for generating a count determined by the difference between the power line frequency and the frequency of current generated by the motor, said counter means repeatedly generating a new count;

first latch means coupled to said counter means for retaining each new count;

second latch means coupled to said first latch means for retaining the count which is present thereat at predetermined intervals;

comparator means for comparing the counts in said first and second latch means, said comparator means generating a first signal if the count in the first latch means is larger and generating a second signal if the count in the second latch means is larger; and means responsive to the output of the comparator means for increasing or decreasing the current to the clutch, whereby the acceleration of the main motor is partially controlled in accordance with whether it is already accelerating or decelerating.

6. Motor starting apparatus comprising:

a starting motor;

a clutch for coupling the starting motor to the main motor to bring the main motor up to speed;

counter means having first and second inputs, for generating a count determined by the difference in frequency between pulses on said first and second inputs;

means responsive to the counts generated by said counter means for operating said clutch to control the speed of the main motor;

means for coupling the power line to the first input of the counter means;

a tachometer coupled to the main motor to generate pulses of a frequency proportional to the speed of the main motor;

a select gate having a first input coupled to the tachometer and a second input coupled to the armature of the main motor, for selectively passing signals from one of them, the select gate having an output connected to the second input of the counter means, means responsive to the main motor reaching a predetermined speed close to full speed, for applying current to the field of the main motor; and means responsive to the main motor generating an output current, for operating the select gate so it thereafter passes signals received from the main motor, whereby monitoring of motor speed is shifted from the tachometer to the motor itself as the motor approaches full speed.

7. Motor starting apparatus for controlling the start-up of a main motor, to minimize disruption oo an alternating-current power line which will energize the motor during full speed operation, comprising:

a starting motor;

controllable clutch means for variably coupling the starting motor to the main motor;

counter means coupled to the power line and the main motor for repeatedly generating a count value dependent upon the difference between motor speed and power line frequency during brief periods of time;

latch means coupled to the counter means for retaining a count thereof;

comparator means coupled to the counter and latch means for generating an output indicating whether the count in the latch means is greater or less than the count last generated by the counter means, whereby to indicate whether the motor speed is increasing or decreasing; and clutch control means responsive to the output of the comparator means for operating the clutch means to increase or decrease the degree of coupling of the starting and main motors, whereby to smoothly bring the main motor up to full speed.

8. The apparatus described in claim 7 including:

means for applying field current to the main motor, so that the motor generates an alternating current on an armature line thereof, which is of a frequency proportional to main motor speed;

phase comparing means having inputs coupled to the power line and said armature line, said phase comparing means being activatable to generating an output signal indicating whether the phase of the current generated by the main motor leads or lags the phase of the power line current; and means for coupling the output signal of the phase comparing means to said clutch control means, to operate the clutch to increase or decrease the degree of coupling of the starting and main motors in accordance with the main motor current lagging or leading the power line current.

* * * * *